O. FRYKMAN.
GAS TURBINE.
APPLICATION FILED NOV. 3, 1919.

1,341,229.

Patented May 25, 1920.
3 SHEETS—SHEET 1.

WITNESS
R.F. Dilworth

INVENTOR
O. Frykman
by F.W. Barber
attorney.

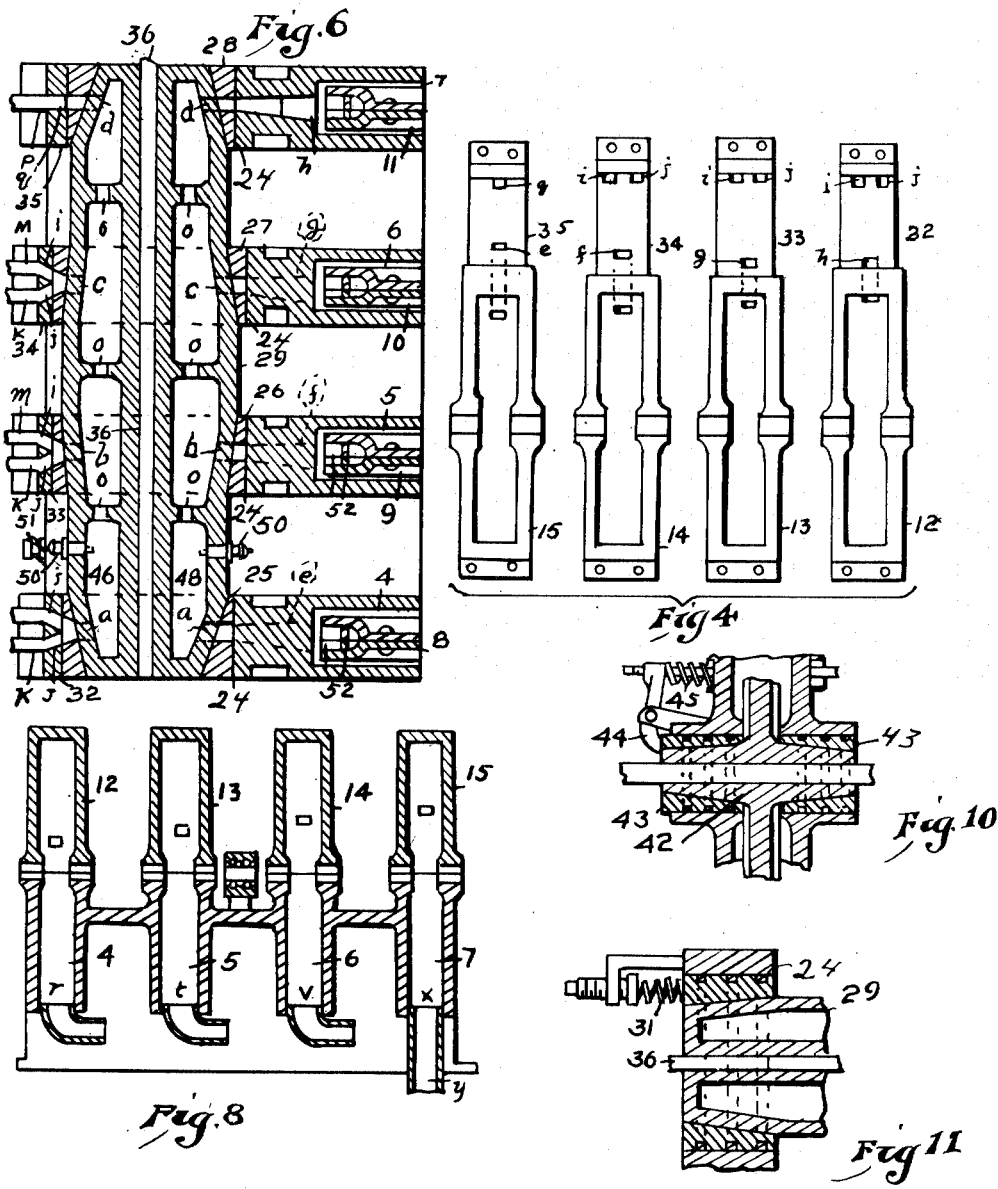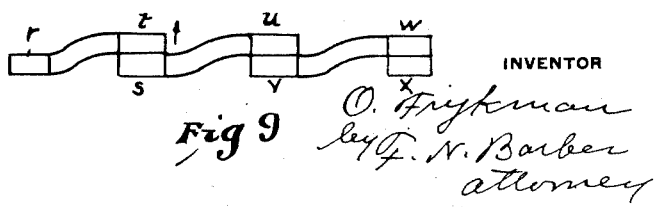

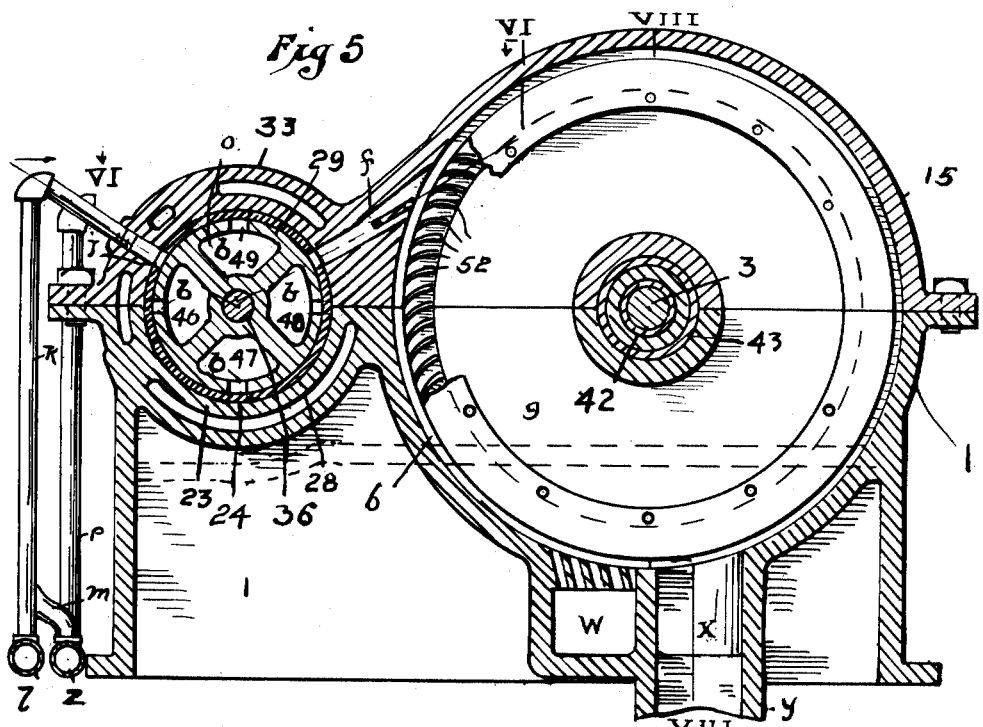
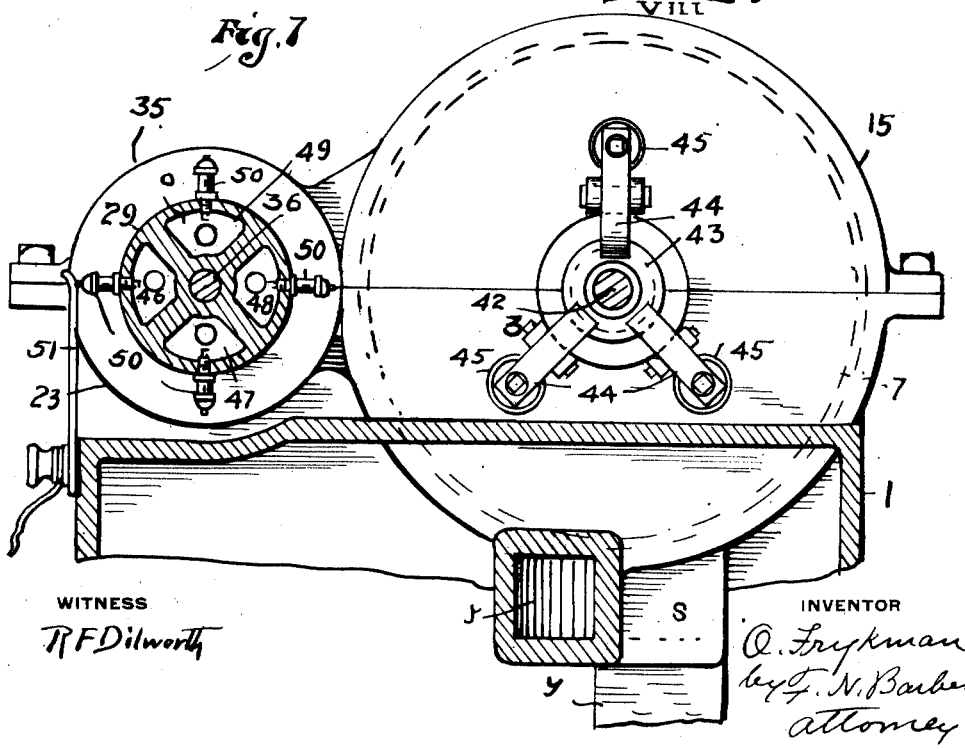

UNITED STATES PATENT OFFICE.

OSCAR FRYKMAN, OF MONESSEN, PENNSYLVANIA.

GAS-TURBINE.

1,341,229.  Specification of Letters Patent.  Patented May 25, 1920.

Application filed November 3, 1919. Serial No. 335,362.

*To all whom it may concern:*

Be it known that I, OSCAR FRYKMAN, a subject of the King of Sweden, residing at Monessen, in the county of Westmoreland and State of Pennsylvania, have invented new and useful Improvements in Gas-Turbines, of which the following is a specification.

My invention relates to gas turbines.

The principal object of this invention is to provide an engine of the gas turbine type with a number of turbine-wheels which receive their driving impulses both from the explosion chambers and from the exhaust gases. My invention further comprises novel means for mixing the gases and bringing them into proper positions for the required sequence of operations. Other objects appear hereinafter. Another object is to support the turbine shaft so as to relieve the packing rings of the turbine wheels from the load of the shaft.

Figure 1:
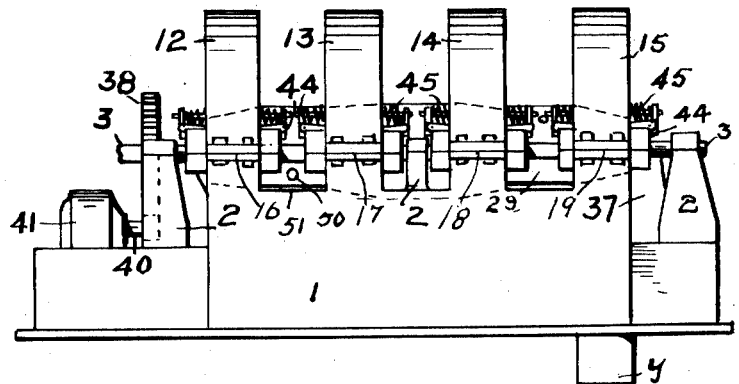
Figure 2:
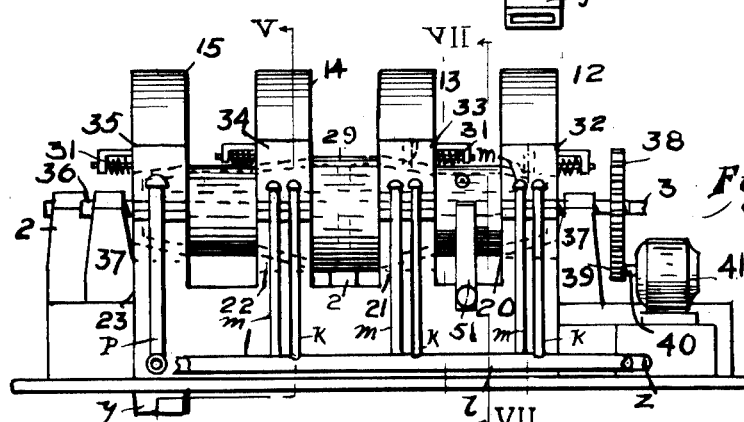
Figure 3:
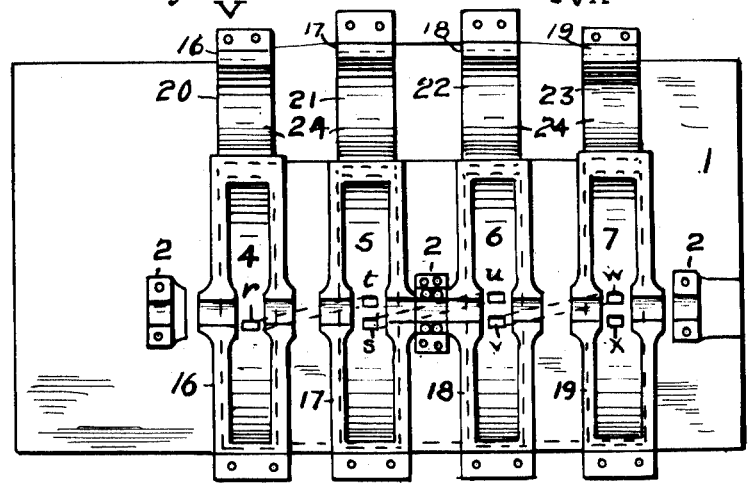

On the accompanying drawings, Figure 1 is a side elevation of an engine embodying my invention; Fig. 2, a side elevation looking at the side opposite that shown on Fig. 1; Fig. 3, a top plan view of the casing with the covers removed; Fig. 4, a bottom plan view of the four covers of casing; Fig. 5, a vertical cross-section on the line V—V, Fig. 2; Fig. 6, a section on the line VI—VI, Fig. 5; Fig. 7, a vertical section on the line VII—VII, Fig. 2; Fig. 8, a vertical section on the line VIII—VIII, Fig. 5, the scale being reduced and the turbine-wheels being removed; Fig. 9, a diagrammatic view of the auxiliary ports and passages for the exhaust gases; Fig. 10, a section of a pair of bearings for the turbine wheels, parts being broken away; and Fig. 11, a section of a bearing for the explosion drum.

On the drawings, 1 designates the lower or fixed portion of the casing having the end and middle bearings 2 for the turbine shaft 3. The casing has four semi-cylindrical chambers 4, 5, 6, and 7 to receive the lower halves of the turbine wheels 8, 9, 10, and 11, respectively. The covers 12 and 15 constitute semi-cylindrical chambers for the upper halves of the turbine wheels, the pairs of chambers 4—12, 5—13, 6—14, and 7—15 constituting the turbine-wheel chambers. The covers tightly fit on seats 16 to 19 on the casing 1 and are bolted to the latter.

The casing 1 has on one side lateral extensions 20 to 23 in line with the chambers 4 to 7, respectively. These extensions have semi-circular upwardly-open surfaces 24 parallel with the shaft 3, these surfaces receiving the lower halves of the tapered bearing rings 25 to 28 in which the drum 29 fits and turns, the rings being constantly pushed up to a gas-tight fit with the drum by means of the springs 31. The covers 12 to 15 have extensions 32 to 35 which fit upon the upper halves of the said rings.

The drum 29 is rotated by the shaft 36 which extends through it and has bearings in the standards 37. The shaft 36 has the spur gear 38 meshing with the pinion 39 on the shaft 40 of the motor 41.

The turbine wheels have their hubs 42 (Fig. 10) tapered and surrounded by tapered rings 43 fitting in openings at the junction of the covers with the casing. The rings are pressed on the hubs by the levers 44 each under the action of a spring 45.

The drum is divided by radial partitions into four chambers 46, 47, 48, and 49, each chamber being fitted with a spark plug 50. The spark-plugs are arranged in a circle between two adjacent turbine chambers, and the outer ends of their central spark terminals engage, as the drum rotates, with the contact 51 insulated from the casing and connected to one terminal of a source of electricity. The drum itself constitutes the other terminal.

Each of the chambers 46 to 49 has four ports $a$, $b$, $c$, and $d$, through the periphery of the drum, arranged to register with the inlet passages $e$, $f$, $g$, and $h$, respectively, leading to the chambers 4, 5, 6, and 7, through extensions 32, 33, 34, and 35. The inlet ports to the passages $e$ to $h$ are placed successively at lower levels (Fig. 4) so that the expanding gases mixed with steam will pass from the drum chambers to the turbine chambers in succession.

The ports $a$ to $c$ in the drum may also register with the air inlet ports $i$ and the gas-inlet ports $j$ in the cover extensions, the ports $i$ and $j$ being arranged side by side to deliver air and gas at the same time to a drum-chamber. Gas under pressure is brought to the ports $j$ by the branch pipes $k$ connected to the gas main $l$, and air is brought to the ports $i$ by the branch pipes $m$ connected to the main $z$.

A pipe $p$ leads dry steam, preferably superheated, to the port $q$ in the cover-extension 35 to admit steam into the drum chamber by way of the ports d. The drum has transverse perforated partitions o between the ports a and b, b and c, and c and d in order to prevent separate currents of steam and gases passing from one end of the drum to the other and compels a thorough mixing of the air, gas, and steam.

At the bottom of the chamber 4 is the exhaust port r. At the bottom of the chamber 5 are the exhaust port s and the inlet port t, the exhaust port being a short distance beyond the inlet port in the direction of rotation of the lower sides of the turbines, as indicated by the arrow on Fig. 9. The port r is connected to the port t. At the bottom of the chamber 6 are the inlet port u and the exhaust port v, the former connected to the port s. At the bottom of the final chamber 7 are the inlet port w and the exhaust port x. The exhaust port x is connected to the exhaust port y.

Air and gas being supplied under pressure through the pipes z and l, an electric spark producing device being connected to the terminal 51, and the motor 41 being set in operation, the parts being initially as on Fig. 1, steam, air and gas are admitted to the drum chamber 46, and after the drum has revolved so as to bring the ports a to d out of registry with the inlet ports i, j, q, the mixture is exploded. After a quarter revolution of the drum, steam, air and gas enter the chamber 49 and the mixture therein is exploded shortly thereafter. At the next quarter revolution of the drum, the expanding gases in the chamber rush through the passages e, f, g, h, and impinge on the blades 52 on the peripheries of the turbine wheels and cause their rotation clockwise, looking at Fig. 5. At the same time a charge enters the chamber 48 and is exploded. At the next quarter revolution of the drum, the chamber 47 receives a charge and is exploded while the charge in the chamber 49 passes through the passages e, f, g, h to the blades 52. At the next quarter revolution the chamber 46 again receives a charge and is exploded, while the expanding charge in the chamber 48 exhausts against the said blades 52. This cycle of operations is repeated so long as power is desired.

After the burned gases and steam in the first turbine chamber reach the port r, they pass to the port t and against the blades 52 of the second turbine-wheel. The gases and steam traveling in the second turbine chamber pass from the port s to the inlet port u and against the third turbine wheel. The gases and steam traveling with this turbine wheel pass from the port v to the inlet port w of the fourth turbine wheel and impinge on the wheel, and the gases and steam traveling with this wheel exhaust finally through the port x and the pipe y, the waste products passing if desired to a condenser (not shown) to remove the steam and the remainder to a compressor (not shown) to be brought to atmospheric pressure, in order to provide a partial vacuum for the exhaust products.

By use of the partitions o, which divide the chambers into sub-chambers, the richest mixture will be in the sub-chambers having the ports a, thereby insuring the richest mixture where the spark-plugs are. The products are more diluted in the other sub-chambers, but time is afforded, while the drum rotates about a half revolution, for a more complete combustion and mixture of the expanding products in the sub-chambers before they impinge on the turbine-wheel blades 52.

I claim:

1. In a gas-engine, a casing having a series of compartments, a turbine wheel in each compartment, a shaft to which the turbine wheels are secured, a rotatable drum divided into radial chambers, means for rotating the drum, means admitting an explosive charge to each chamber at one stage of the rotation of the drum, means for exploding the charge at another stage thereof, means admitting the expanding exploded gases into driving engagement with each of the turbine wheels, and means for permitting the exhaust products in the casing compartments to escape.

2. In a gas-engine, a casing having a series of compartments, a turbine wheel in each compartment, a shaft to which the turbine wheels are secured, a rotatable drum divided into radial chambers, means for rotating the drum, means admitting an explosive charge to each chamber at one stage of the rotation of the drum, means for exploding the charge at another stage thereof, means admitting the expanding exploded gases successively into driving engagement with the turbine wheels, and means for permitting the exhaust gases in the casing compartments to escape.

3. In a gas-engine, a casing having a series of compartments, a turbine wheel in each compartment, a shaft to which the turbine wheels are secured, a rotatable drum divided into radial chambers, means for rotating the drum, means admitting an explosive charge to each chamber at one stage of the rotation of the drum, means for exploding the charge at another stage thereof, means admitting the expanding exploded gases into driving engagement with each of the turbine wheels, and means for permitting the exhaust gases in the casing compartments to escape.

4. In a gas-engine, a casing having a series of compartments, a turbine wheel in each compartment, a shaft to which the turbine wheels are secured, a rotatable drum divided into radial chambers, means for rotating the drum, means admitting an explosive charge to each chamber at one stage of the rotation of the drum, means for exploding the charge at another stage thereof, means admitting the expanding exploded gases into driving engagement with each of the turbine wheels, and means for conducting the gases from one casing compartment into driving engagement with a turbine wheel in another compartment.

5. In a gas-engine, a casing having a series of compartments, a turbine wheel in each compartment, a shaft to which the turbine wheels are secured, a rotatable drum divided into radial chambers, means for rotating the drum, means admitting an explosive charge to each chamber at one stage of the rotation of the drum, means for exploding the charge at another stage thereof, means for admitting steam to each chamber, means admitting the expanding exploded gases and steam into driving engagement with each of the turbine wheels, and means for permitting the exhaust products in the casing compartments to escape.

6. In a gas-engine, a casing having a series of compartments, a turbine wheel in each compartment, a shaft to which the turbine wheels are secured, a rotatable drum divided into radial chambers, perforated partitions dividing the radial chambers into sub-chambers, means for rotating the drum, means admitting an explosive charge to some of the sub-chambers, and for admitting steam to the remainder of the sub-chambers, at one stage of the rotation of the drum, means for exploding the charge at another stage thereof, means admitting the expanding exploded gases and steam into driving engagement with each of the turbine wheels, and means for permitting the exhaust products in the casing compartments to escape.

7. In a gas-engine, a casing having a series of compartments, a turbine wheel in each compartment, a shaft to which the turbine wheels are secured, a rotatable drum divided into radial chambers, perforated partitions dividing the radial chambers into sub-chambers, means for rotating the drum, means admitting an explosive charge to consecutive sub-chambers beginning with sub-chambers at one end of the drum but not including the opposite end sub-chambers, and for admitting steam to the remaining sub-chambers at the other end of the drum, at one stage of the rotation of the drum, means for exploding the charge at another stage thereof, means admitting the expanding exploded gases and steam into driving engagement with each of the turbine wheels, and means for permitting the exhaust products in the casing compartments to escape.

8. In a gas-engine, a casing having a series of compartments, a turbine wheel in each compartment, a shaft to which the turbine wheels are secured, a rotatable drum divided into radial chambers, perforated partitions dividing the radial chambers into sub-chambers, means for rotating the drum, means admitting an explosive charge to consecutive sub-chambers beginning with sub-chambers at one end of the drum but not including the opposite end sub-chambers, and for admitting steam to the remaining sub-chambers at the other end of the drum, at one stage of the rotation of the drum, means for exploding the charge in the end sub-chamber of those containing said explosive charges, means admitting the expanding exploded gases and steam into driving engagement with each of the turbine wheels, and means for permitting the exhaust products in the casing compartments to escape.

Signed at Pittsburgh, Pa., this 21st day of October, 1919.

OSCAR FRYKMAN.